US011250485B2

(12) United States Patent
Fox

(10) Patent No.: US 11,250,485 B2
(45) Date of Patent: Feb. 15, 2022

(54) FILTERING DIGITAL IMAGES STORED ON A BLOCKCHAIN DATABASE

(71) Applicant: International Business Machines Corporation, Armonk, NY (US)

(72) Inventor: Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 16/005,976

(22) Filed: Jun. 12, 2018

(65) Prior Publication Data

US 2019/0378192 A1 Dec. 12, 2019

(51) Int. Cl.
*G06Q 30/00* (2012.01)
*G06Q 30/06* (2012.01)
*G06F 16/51* (2019.01)
*G06F 16/54* (2019.01)
*G06F 16/58* (2019.01)
*G06N 20/00* (2019.01)

(52) U.S. Cl.
CPC ......... *G06Q 30/0625* (2013.01); *G06F 16/51* (2019.01); *G06F 16/54* (2019.01); *G06F 16/5866* (2019.01); *G06Q 30/0635* (2013.01); *G06N 20/00* (2019.01)

(58) Field of Classification Search
None
See application file for complete search history.

(56) References Cited

U.S. PATENT DOCUMENTS

| 5,296,884 | A | 3/1994 | Honda et al. |
| 6,282,362 | B1 | 8/2001 | Murphy et al. |
| 6,914,626 | B2 | 7/2005 | Squibbs |
| 6,985,875 | B1 * | 1/2006 | Wolf ............ G06Q 10/00 348/157 |
| 8,116,598 | B2 | 2/2012 | Filley |
| (Continued) | | | |

FOREIGN PATENT DOCUMENTS

WO WO2003024088 3/2003

OTHER PUBLICATIONS

Laura Scherling. "Blockchain Technologies in Community-Based Arts." Columbia Academic Commons. Aug. 3, 2017. (Year: 2017).*

(Continued)

*Primary Examiner* — Mila Airapetian
(74) *Attorney, Agent, or Firm* — Schmeiser, Olsen & Watts, LLP; Stephanie Carusillo

(57) ABSTRACT

A system and method for filtering digital images stored on a blockchain database to locate one or more specific digital images from a corpus of digital images from an event includes receiving a search criteria from a user for searching through the corpus of digital images stored on the blockchain database, filtering the corpus of digital images stored on the blockchain database based on the plurality of factors that match the search criteria, locating the one or more specific digital photographs that match the search criteria among the corpus of digital images stored on the blockchain database, as a function of the filtering, presenting the one or more specific digital photographs to the user for selection and purchase of the one or more specific digital photographs, and processing a purchase order for the one or more specific digital photographs selected for purchase by the user.

14 Claims, 13 Drawing Sheets

(56) References Cited

U.S. PATENT DOCUMENTS

| | | | | |
|---|---|---|---|---|
| 8,831,998 | B1* | 9/2014 | Cramer | G06Q 20/1235 705/59 |
| 9,521,515 | B2 | 12/2016 | Zimerman et al. | |
| 2003/0004916 | A1 | 1/2003 | Lewis | |
| 2004/0220965 | A1* | 11/2004 | Harville | G06F 16/58 |
| 2005/0104976 | A1* | 5/2005 | Currans | H04N 1/00244 348/231.5 |
| 2006/0080286 | A1 | 4/2006 | Svendsen | |
| 2006/0253491 | A1* | 11/2006 | Gokturk | G06F 16/5846 |
| 2011/0183732 | A1* | 7/2011 | Block | G07F 17/32 463/1 |
| 2015/0066941 | A1* | 3/2015 | Martin | G06F 16/2228 707/741 |
| 2015/0127643 | A1* | 5/2015 | Cohen | G06F 16/447 707/725 |
| 2015/0131872 | A1* | 5/2015 | Ganong | G06K 9/00677 382/118 |
| 2016/0275352 | A1 | 9/2016 | Rajappa et al. | |
| 2017/0041148 | A1 | 2/2017 | Pearce | |
| 2017/0180961 | A1 | 6/2017 | Gauglitz et al. | |
| 2017/0206523 | A1* | 7/2017 | Goeringer | G06Q 20/409 |
| 2017/0372308 | A1* | 12/2017 | Metnick | G06Q 20/3829 |

OTHER PUBLICATIONS

Martin Zeilinger. "Digital Art as 'Monetised Graphics': Enforcing Intellectual Property on the Blockchain." Nov. 24, 2016. (Year: 2016).*

R. Stephens, "Read an image file's EXIF orientation data in C#." Posted on Jul. 5, 2016 http://csharphelper.com/blog/2016/07/read-an-image-files-exif-orientation-data-in-c/ [Accessed Jan. 13, 2018], 4 pages.

A. Girgensohn, "Flexible access to photo libraries via time, place, tags, and visual features." In Proceedings of the 10th annual joint conference on Digital libraries (JCDL '10). ACM, New York, NY, USA, 187-196. 2010.

P. Mcparlane, "On contextual photo tag recommendation." In Proceedings of the 36th international ACM SIGIR conference on Research and development in information retrieval (SIGIR '13). ACM, New York, NY, USA, 965-968, 2013.

IBM, "Method and System for Providing Location Specific Tagging To Photographs." IP.com Disclosure No. IPCOM000190467D, Original Publication Date: Dec. 1, 2009, 3 pages.

K. Huang, "Traveling through space-time: an interactive photo browsing system." In SIGGRAPH Asia 2012 Posters (SA '12). ACM, New York, NY, USA, Article 22, 1 page, 2012.

M. Cunningham, "Photo's hidden data holds secrets—your exact location." Jun. 7, 2016, https://www.komando.com/tips/12056/photos-reveal-secrets-like-your-location/all [Accessed Jan. 13, 2018], 2 pages.

M. Naaman, "Automatic organization for digital photographs with geographic coordinates." In Proceedings of the 4th ACM/IEEE-CS joint conference on Digital libraries (JCDL '04). ACM, New York, NY, USA, 53-62, 2004.

Mell, Peter et al.; "The NIST Definition of Cloud Computing;" National Institute of Standards and Technology; Special Publication 800-145; Sep. 2011; 7 pages.

E. Rapoport, "Auto-Curating Photo Albums Based On Geolocation." IP.com Disclosure No. IPCOM000225723D, Publication Date: Feb. 28, 2013, 3 pages.

Sarit Sotangkur, Cloud computing's effect on digital photography, Apr. 17, 2014, https://www.ibm.com/blogs/cloud-computing/2014/04/cloud-computings-effectdigital-photography/, 9 pages.

* cited by examiner

| Capturing Device ID | Timestamp | Date | Dynamic Geolocation | Field of View Direction | Beacon Area | Photographer ID | Type of Device |
|---|---|---|---|---|---|---|---|
| 110a | 19:06:21 | mm/dd/yyyy | High School Soccer Field | SE | North Goalie Box | 48631 | Camera |
| 110b | 20:17:43 | mm/dd/yyyy | High School Soccer Field | NW | Field Only | 95174 | Camera |
| 110c | 19:27:03 | mm/dd/yyyy | High School Soccer Field | W | Midfield | 32689 | Cell |
| 110d | 19:26:45 | mm/dd/yyyy | High School Soccer Field | E | Midfield | 48731 | Cell |
| 110e | 19:26:11 | mm/dd/yyyy | High School Soccer Field | SW | Field Only | 12974 | Cell |
| 110f | 19:27:09 | mm/dd/yyyy | High School Soccer Field | SW | South Goalie Box | 23978 | Video Camera |
| 110g | 20:18:02 | mm/dd/yyyy | High School Soccer Field | S | Stands | 45358 | Cell |

FIG. 7

| Capturing Device ID | Timestamp | Date | Dynamic Geolocation | Field of View Direction | Beacon Area | Photographer ID | Type of Device |
|---|---|---|---|---|---|---|---|
| 110f | 19:27:09 | mm/dd/yyyy | High School Soccer Field | SW | South Goalie Box | 23978 | Video Camera |

FIG. 8

| Capturing Device ID | Timestamp | Date | Dynamic Geolocation | Field of View Direction | Beacon Area | Photographer ID | Type of Device |
|---|---|---|---|---|---|---|---|
| 110c | 18:30:03 | mm/dd/yyyy | High School Soccer Field | W | Midfield | 32689 | Cell |
| 110d | 19:26:45 | mm/dd/yyyy | High School Soccer Field | E | Midfield | 48731 | Cell |

FIG. 9A

| Capturing Device ID | Timestamp | Date | Dynamic Geolocation | Field of View Direction | Beacon Area | Photographer ID | Type of Device |
|---|---|---|---|---|---|---|---|
| 110d | 19:26:45 | mm/dd/yyyy | High School Soccer Field | E | Midfield | 48731 | Cell |

FIG. 9B

FILTERING DIGITAL IMAGES STORED ON
A BLOCKCHAIN DATABASE

TECHNICAL FIELD

The present invention relates to systems and methods for filtering digital images on the blockchain, and more specifically the embodiments of a digital image blockchain filtering system for filtering digital images stored on a blockchain database to locate one or more specific digital images from a corpus of digital images from an event.

BACKGROUND

Photography is the science, art, application and practice of creating durable images. Within the realm of photography there are traditional modes of production that included amateur, commercial, art, and photojournalism. There are normal distribution models for each type of photography based on traditional supply and demand models. Further, the models are based on pushing or pulling digital content. For example, stock photography is the supply of photographs, which are often licensed for specific uses. Finding images that are desirable to a user is difficult because of the volume of available digital images and the inability to be certain whether a professional quality image of a person or object of interest at a particular event exists.

SUMMARY

An embodiment of the present invention relates to a method, and associated computer system and computer program product, for filtering digital images stored on a blockchain database to locate one or more specific digital images from a corpus of digital images from an event. A processor of a computing system receives a search criteria from a user for searching through the corpus of digital images stored on the blockchain database, wherein digital data associated with each digital image is uploaded to the blockchain database by a digital data capturing device after the digital data capturing device appends metadata to the digital data at a time of creation of the digital data that defines a plurality of factors associated with the digital image. The corpus of digital image stored on the blockchain database is filtered based on the plurality of factors that match the search criteria. The one or more specific digital photographs are located that match the search criteria among the corpus of digital images stored on the blockchain database, as a function of the filtering. The one or more specific digital photographs is presented to the user for selection and purchase of the one or more specific digital photographs. A purchase order is processed for the one or more specific digital photographs selected for purchase by the user.

BRIEF DESCRIPTION OF THE DRAWINGS

FIG. 7 depicts a data table of a populated blockchain database, wherein the digital images are classified based on factors, in accordance with embodiments of the present invention.

FIG. 8 depicts a data table that has been further filtered based on a user search criteria, in accordance with embodiments of the present invention.

FIG. 9A depicts a first data table that has been filtered based on a user search criteria, in accordance with embodiments of the present invention.

FIG. 9B depicts a second data table that has been further filtered from the first data table, based on updated user search criteria, in accordance with embodiments of the present invention.

DETAILED DESCRIPTION

Aspiring and professional photographers love taking photos for various events, but the photographers might not always be formally hired for an event that the photographer wanted to cover. Currently, there is no way for a user to locate and purchase digital images captured by a photographer at a location within a specific space, time, location, and further frame of reference. Consumers might want to have a professional quality image of an event, but the consumer may not want to formally hire a full time, professional photographer by the hour or for the entire event. Further, results vary widely by photographer and the consumer is forced to take a chance on overall quality, based on the photographer's proceeding reputation and prior work. The consumer may only want to pay for what is produced with a specific scope, subject, point of interest, or limited event in mind. For example, the consumer may want a highly specific image(s), but the traditional delivery system does not provide supply and demand of digital images within this model.

Accordingly, embodiments of the present invention may collect photographs in a cloud-based commerce site utilizing blockchain technology, and then immediately associate the photographs through a means of subject matter awareness based on a specific geofence, timestamp, and camera angle. Furthermore, embodiments of the present invention may dynamically match the content creator with the purchaser in real time or after the event has occurred to produce a commercial transaction for the digital content (i.e. photographs). Embodiments of the present invention may be a method for combining content creation (e.g. photography), content management (e.g. blockchain), and location awareness (e.g. geofence) technologies within a new and novel way to produce a hybrid model for digital content commerce and distribution. Additionally, embodiments of the present invention may be utilized to reduce online counterfeiting and manipulating, such as detecting digital image manipulation through the specific use of blockchain technology. The mathematical equations for supply and demand can be achieved while ensuring that the photographs have not been tampered with or adversely altered along the timeline of when, where, and how the photographs were captured and stored. The ability to secure and manage the geofence for location awareness improves upon existing database filtering and manipulation for searching and locating digital images based on a plurality of dynamic factors, including location-based awareness and person/objects of interest contained within the digital image.

Figure 1:
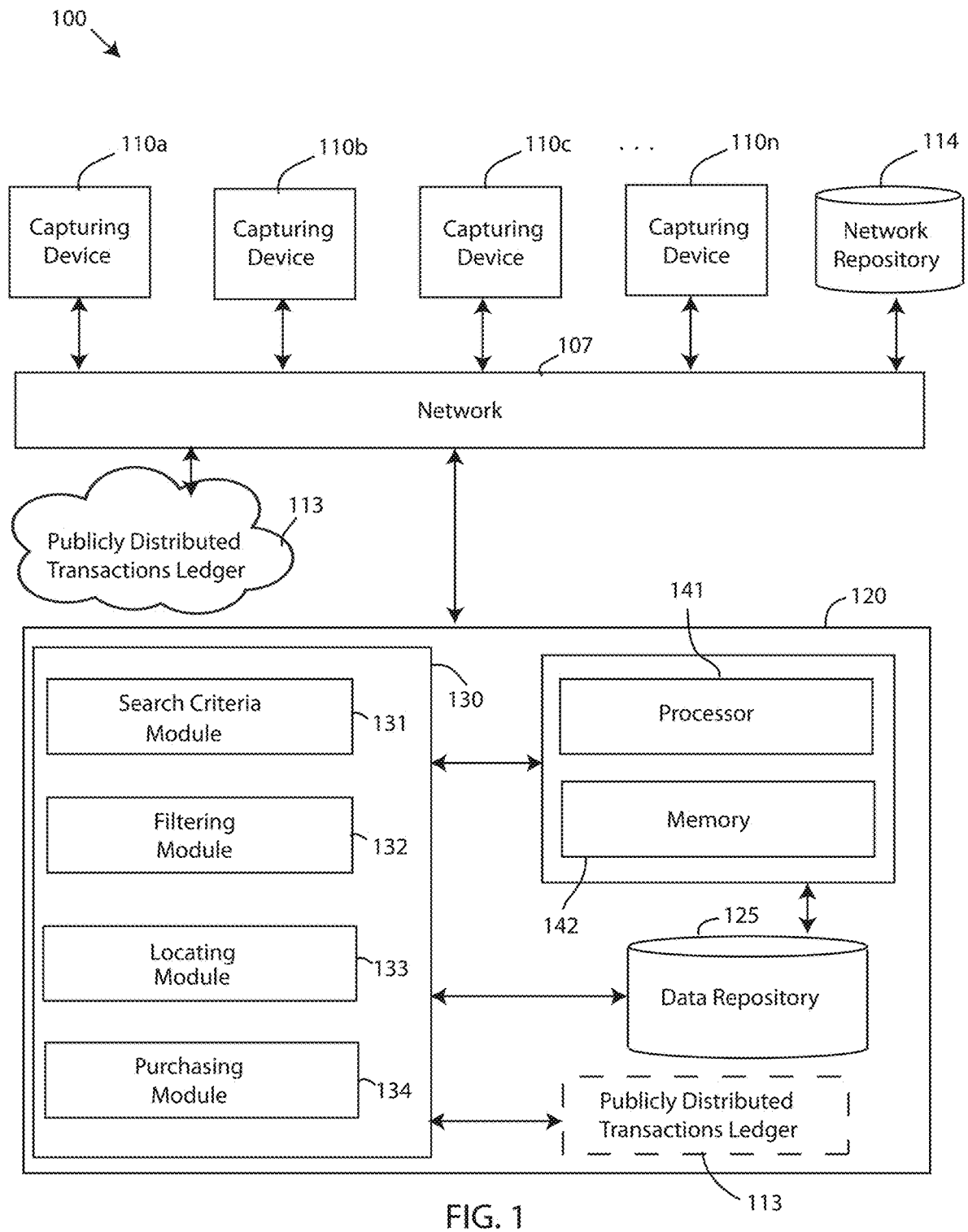
FIG. 1 depicts a block diagram of a digital image blockchain filtering system, in accordance with embodiments of the present invention.

Referring to the drawings, FIG. 1 depicts a block diagram of a digital image blockchain filtering system 100, in accordance with embodiments of the present invention. Embodiments of the digital image blockchain filtering system 100 may be a system for filtering digital images stored on a blockchain database to locate one or more specific digital images from a corpus of digital images from an event. Embodiments of the digital image blockchain filtering system 100 may be useful for users searching a blockchain database for photographs of people, objects, etc. at an event, at different locations of the event, different times, different angles, different quality of images, etc. For example, the digital image blockchain filtering system 100 may improve blockchain database indexing, searching, filtering, manipulation, and control by allowing a user to search for images based on location specific rules and object-specific rules to exclude irrelevant photographs and isolate relevant photographs tailored to a specific need of the user. In other words, the digital image blockchain filtering system 100 may provide a blockchain filtering tool to permit indexing and searching of digital images stored on the blockchain based on a contextual information of the digital images based on a location-specific rule, object-specific rule, time-specific rule, field-of-view direction rule. The digital image blockchain filtering system 100 may perform one or more pre-filters using machine learning visual recognition engines and facial recognition software to reduce a total number of digital images to be searched based on a user search criteria (e.g. by eliminating irrelevant photographs based on a tagging keyword of person of interest). The digital image blockchain filtering system 100 may thus reduce a searching time and save additional computer resources during the searching/filtering because the computing system need only to filter relevant images to narrow down and locate one or more specific digital images that match a user's search criteria. Examples of a digital image may be a digital photograph, a photograph, a still screenshot of a digital video, a screenshot of a live digital feed, or any other digital data file that can be captured by an electronic capturing device.

Embodiments of the digital image blockchain filtering system 100 may be a filtering system, a digital image searching and indexing system, a blockchain filtering tool, a location-awareness search tool for digital images, a hybrid push-pull model for blockchain filtering, and the like. Embodiments of the digital image blockchain filtering system 100 may include a computing system 120. Embodiments of the computing system 120 may be a computer system, a computer, a server, one or more servers, a backend computing system, and the like.

Furthermore, embodiments of digital image blockchain filtering system 100 may include a plurality of capturing devices 110a, 110b, 110c . . . 10n, and a publicly distributed transactions ledger 113 that are communicatively coupled to the computing system 120 over a network 107. For instance, information/data may be transmitted to and/or received from the plurality of capturing devices 110a, 110b, 110c . . . 10n, and the publicly distributed transactions ledger 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information of the photographer, an event, digital images captured at the event, user search activity, user purchases, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging information of the photographer, an event, digital images captured at the event, user search activity, user purchases, and the like, to generate both historical and predictive reports regarding a particular user or a particular corpus of images from an event, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the capturing devices 110a, 110b, 110c . . . 110n may be a computing device, a cell phone, a mobile computing device, a tablet computer, a wearable computing device, a smartwatch, an augmented reality device, smart-glasses, a digital camera, a camera, an ultra-compact digital camera, a compact digital camera, a large sensor compact digital camera, compact system cameras, mirrorless cameras, a single-lens reflex camera (SLR), a rangefinder digital camera, a compact digital single-lens reflex camera (DSLR), medium format digital cameras, and the like. The capturing devices 110*a*, 110*b*, 110*c* . . . 110*n* may be a digital data capturing device or any electronic device that can take a digital photograph and connect to the Internet. The reference numbers with sub-letters and/or ellipses, for example describing capturing devices as 110*a*, 110*b*, 110*c* . . . 110*n* may signify that the embodiments are not limited only to the amount of elements actually shown in the drawings, but rather, the ellipses between the letters and the $n^{th}$ element indicate a variable number of similar elements of a similar type. For instance, with regard to the capturing device 110 depicted in FIG. 1, any number of a plurality of capturing devices 110 may be present including capturing device 110*a*, capturing devices 110*b*, and a plurality of additional capturing devices up to the $n^{th}$ number of capturing devices 110*n*, wherein the variable "n" may represent the last element in a sequence of similar elements shown in the drawing. In an exemplary embodiment, the number of capturing devices 110 may refer to a number of devices used to take at least one photograph at an event or location within a particular geofence.

Figure 2:
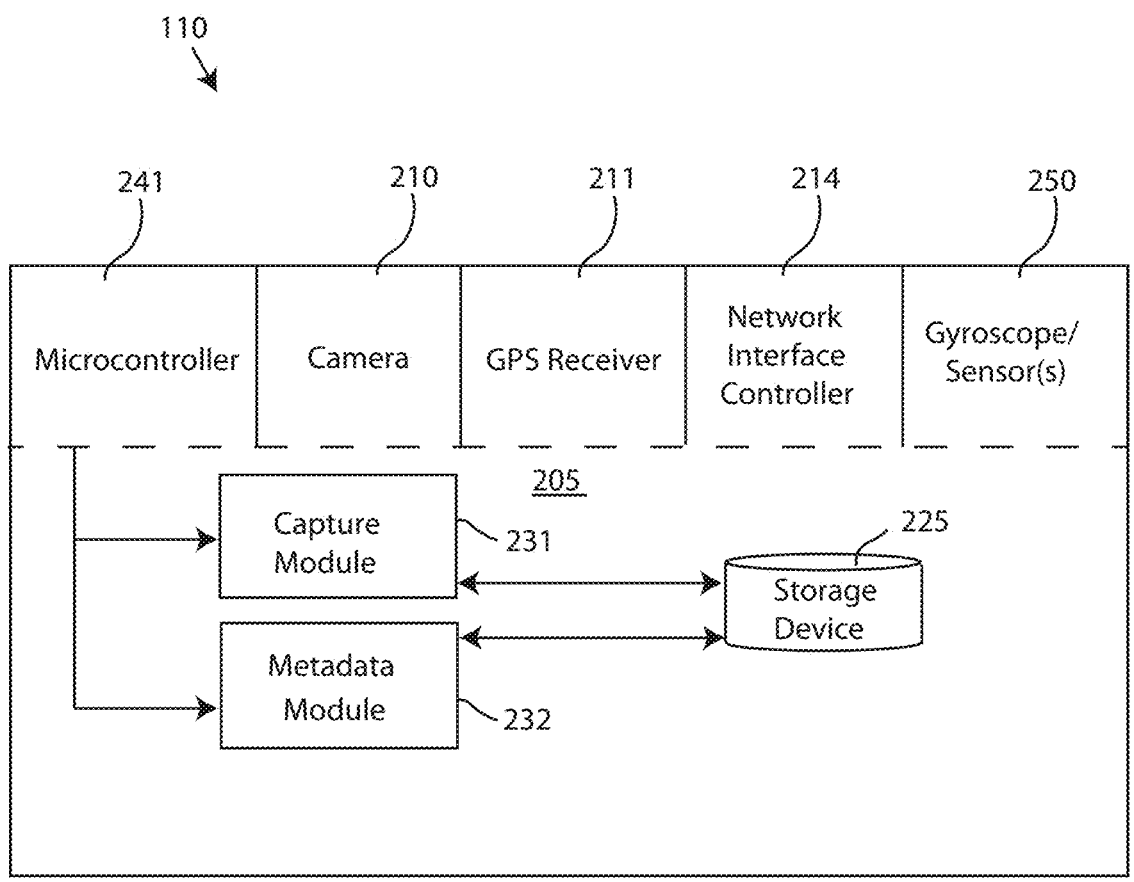
FIG. 2 depicts a block diagram of a capturing device, in accordance with embodiments of the present invention.

FIG. 2 depicts a block diagram of a capturing device 110, in accordance with embodiments of the present invention. Embodiments of the capturing device 110 may be used or otherwise operated by a person in attendance for an event within a particular geofence or otherwise defined location and/or time. Embodiments of the capturing device 110 may include hardware components such as a processor or microcontroller 241, camera 210, GPS receiver 211, network interface controller 214, and a gyroscope and/or other sensors 250. Software components of the capturing device 110 may be located in a memory system 205 of the capturing device 110. Embodiments of the capturing device 110 may include a microcontroller 241 for implementing the tasks associated with the capturing device 110. The GPS receiver 211 may communicate with a GPS satellite to determine a coordinate or the capturing device 110, in real time. Further, embodiments of the capturing device 110 may include a camera 210 to capture or otherwise take a digital photograph of the physical world. For example, the camera 210 may capture a digital image of an object or person within a particular area of an event. Embodiments of the network interface controller 214 may be a hardware component of the capturing device 110 that may connect the capturing device 110 to network 107 and the blockchain 113. The network interface controller may transmit and receive data, including the transmission of digital data either stored on the capturing device 110 or obtained by the capturing device 110. In some embodiments, the digital data may be stored in storage device 225 of memory system 205 of the capturing device 110. The network interface controller 214 may access the storage device 225, and transmit the data over the network 107 to the computing system 120. Additionally, embodiments of capturing device 110 may include a gyroscope and/or other sensors 250. The gyroscope 250 of the capturing device 110 may determine angles, field-of-view direction, etc. of the capturing device 110 at a moment that a digital photograph is taken with the capturing device 110.

Furthermore, embodiments of the memory system 205 of the capturing device 110 may include a capture module 231 and a metadata module 232. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory system 205 of the capturing device 110. A module (whether hardware, software, or a combination thereof) may be designed to implement or execute one or more particular functions or routines.

Embodiments of the capture module 231 may include one or more components of hardware and/or software program code for capturing, collecting, taking, obtaining, acquiring, etc. digital data associated with a digital photograph. In other words, the capturing module 131 may be responsible for the operation of the camera 210 for taking digital photographs. Moreover, embodiments of the capturing device 110 may include a metadata module 232. Embodiments of the metadata module 232 may include one or more components of hardware and/or software program code uploading the digital data to the blockchain database 113 after or in response to appending metadata to the digital data at a time of creation of the digital. For instance, embodiments of the metadata module 132 may upload the digital data to the blockchain database 113 for storing on the blockchain database 113 after the photograph is taken by the capturing device 110. Prior to uploading the digital data, embodiments of the metadata module 132 may append metadata to the digital data/digital image that defines one or more dynamic factors. Embodiments of the dynamic factors may include a date, a capturing device identification information, an image identification, an image owner, a timestamp, a dynamic geolocation, a camera lens angle, a field of view direction, a beacon area, a geofence, a point of interest, a context surrounding the digital image, and a person of interest, and the like. For example, the metadata module 132 may append metadata relating to a time at which the capturing device 110 captured the digital image (e.g. apply a timestamp). The metadata module 132 may append metadata relating to a GPS coordinate of the capturing device 110 at the time the digital image is captured. The metadata module 132 may append metadata relating to a position in relation to a X axis, Y axis, and Z axis of the capturing device 110, which may be used to calculate a lens angle or direction (e.g. N, NW, NE, S, SW, WE, W, and E) that the capturing device 110 is facing when taking the digital photograph. The metadata module 132 may append metadata relating to a model number of the capturing device 110, a serial number of the capturing device 110, an owner of the capturing device 110, a photographer ID associated with the capturing device 110, and the like.

Figure 3:
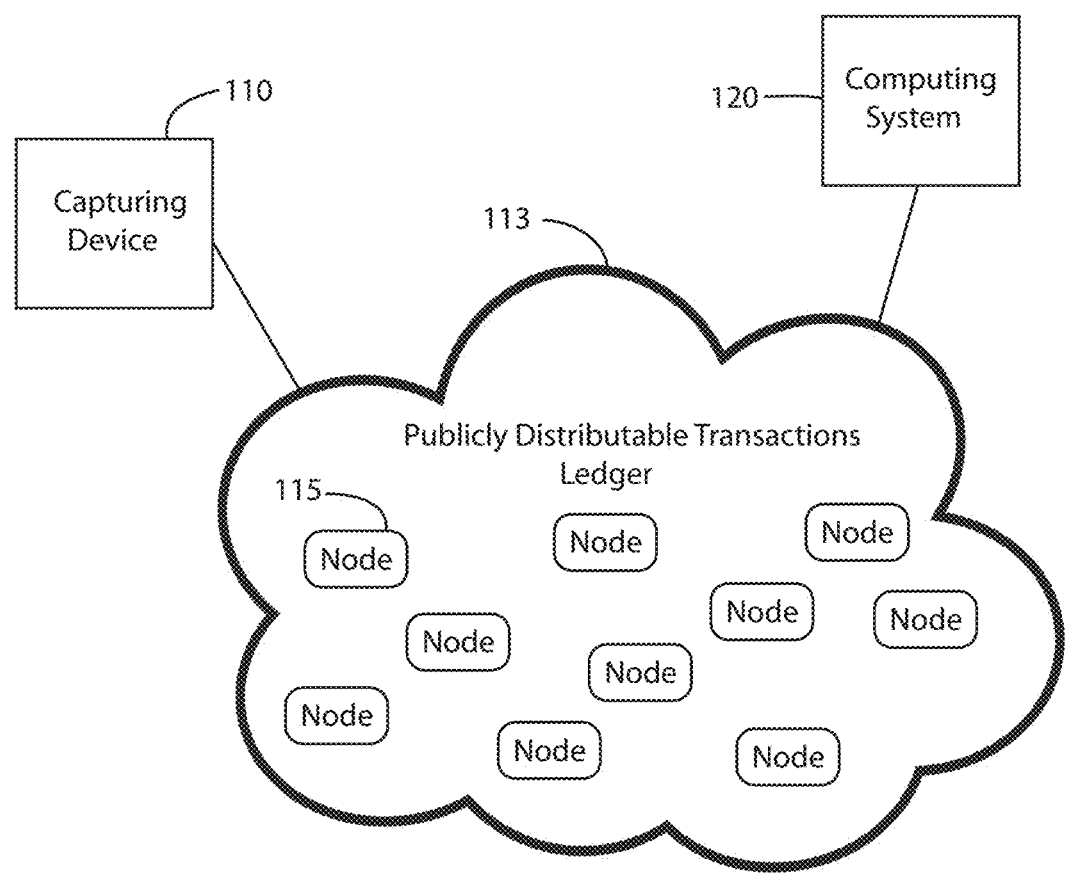
FIG. 3 depicts an embodiment of a publicly distributable transactions ledger, in accordance with embodiments of the present invention.

Referring back to FIG. 1, embodiments of the digital image blockchain filtering system 100 may include a publicly distributed ledger 113 (i.e. blockchain). Embodiments of the computing system may be connected to the ledger 113 over network 107. In other embodiments, the computing system 120 may be a server as part of the ledger 113. The uploaded digital images with appended metadata may be stored on the publicly distributable transactions ledger 113. The recordation and storage of the digital images and metadata on the ledger 113 is immutable and almost impossible to fraudulently change the details of the digital images and metadata stored on the ledger 113 due to the nature of the decentralized ledger, otherwise referred to as the blockchain. FIG. 3 depicts an embodiment of a publicly distributable transactions ledger 113, in accordance with embodiments of the present invention. Embodiments of ledger 113 may be a distributed peer-to-peer network, including a plurality of nodes 115. The ledger 113 may represent a computing environment for operating a decentralized framework that can maintain a distributed data structure. In other words, ledger 113 may be a secure distributed transaction ledger or a blockchain that may support document management. Each node 115 may maintain an individual public ledger (i.e. maintained publicly) according to set procedures that employ cryptographic methods and a proof-of-work concept. In view of the public nature of the ledger and the proof-of-work concept, the nodes 115 collectively create a decentralized, trusted network. Further, embodiments of the publicly decentralized trusted ledger 113 may be accessible by the computing system 120 and the capturing device 110 for searching, indexing, filtering, uploading content, downloading content, purchasing content, etc.

Figure 4:
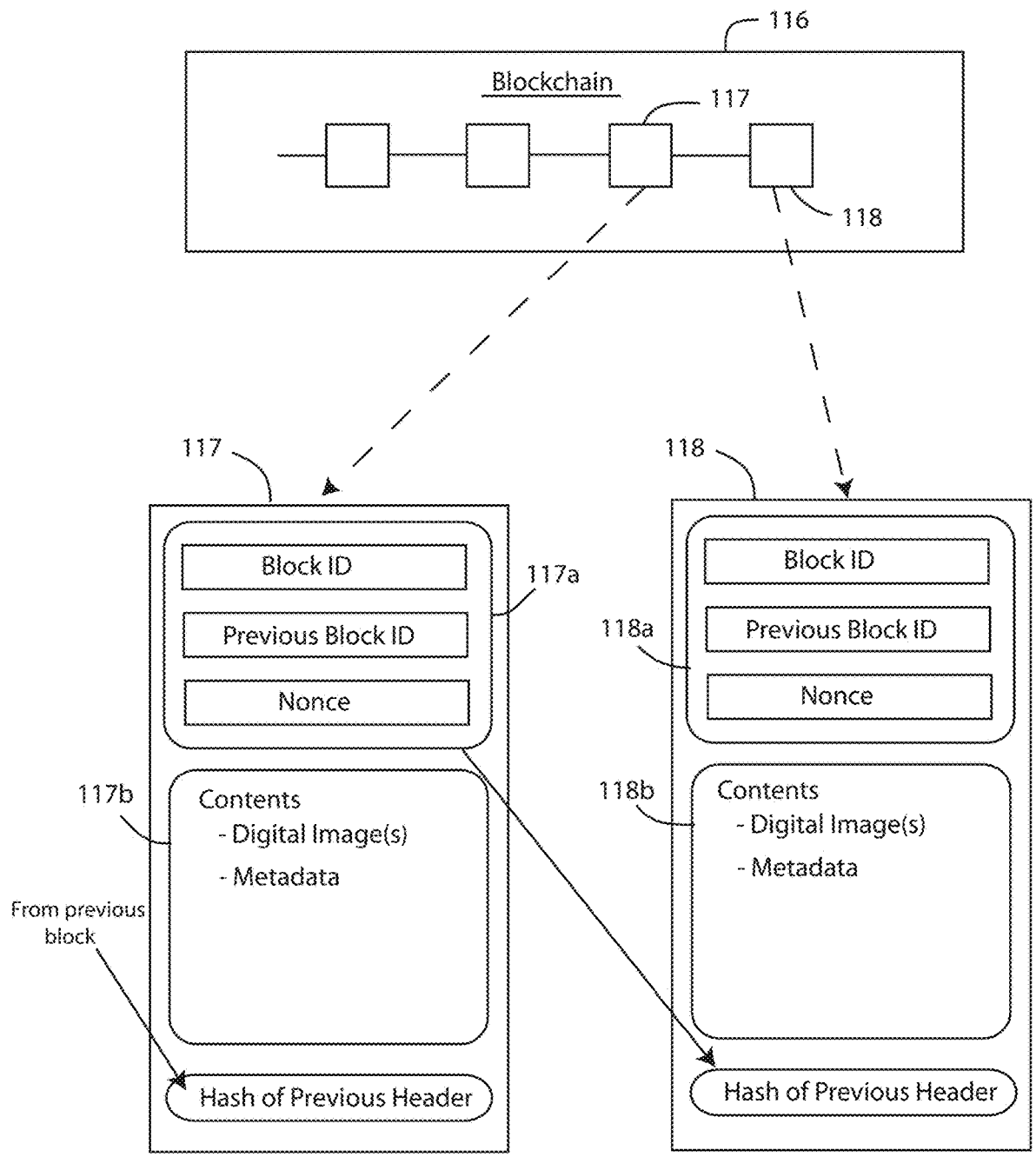
FIG. 4 depicts a blockchain and two exemplary blocks of the blockchain, in accordance with embodiments of the present invention.

FIG. 4 depicts a blockchain 116 and two exemplary blocks 117, 118 of the blockchain 116, in accordance with embodiments of the present invention. Embodiments of the blockchain 116 may represent the publicly distributable transactions ledger 113, and may include a plurality of blocks. Each block, such as block 117 and block 118 may include data regarding recent transactions and/or contents relating to digital images and appended metadata, linking data that links one block 118 to a previous block 117 in the blockchain, proof-of-work data that ensures that the state of the blockchain 116 is valid, and is endorsed/verified by a majority of the record keeping system. The confirmed transactions of the blockchain are done using cryptography to ensure that the integrity and the chronological order of the blockchain are enforced and can be independently verified by each node 115 of the blockchain 116. New transactions may be added to the blockchain 116 using a distributed consensus system that confirms pending transactions using a mining process, which means that each transaction can easily be verified for accuracy, but very difficult or impossible to modify. Moreover, embodiments of a block 117 of the blockchain 116 may include a header 117a and a content 117b. Embodiments of the header 117a may include a block ID, a previous block ID, and a nonce. The nonce may represent a proof-of-work. The header 117a may be used to link block 117 to other blocks of the blockchain. Embodiments of the block contents 117b may include transaction information relating to a transaction for adding a new digital image with appended metadata. Likewise, block 118 may include a header 118a and contents 118b. Block 118 includes a hash of the previous block's header (i.e. 117a), thereby linking the blocks 117, 118 to the blockchain. The transaction information cannot be modified without at least one of the nodes 115 noticing; thus, the blockchain 116 can be trusted to verify transactions occurring on the blockchain 116. Further, access to blocks of a blockchain 116 that include the digital images may only be accessible using a public key associated with a user account or identity, which is publicly available, along with a private key unique to the user, and known only to the user.

Furthermore, embodiments of the computing system 120 of the digital image blockchain filtering system 100 may be equipped with a memory device 142 which may store various data/information/code, and a processor 141 for implementing the tasks associated with the digital image blockchain filtering system 100. In some embodiments, the blockchain image filtering application 130 may be loaded in the memory device 142 of the computing system 120. Embodiments of the blockchain image filtering application 130 may be an interface, an application, a program, a module, or a combination of modules. In an exemplary embodiment, the blockchain image filtering application 130 may be a software application running on one or more back end servers, such as computing system 120, wherein a user interface portion of the software application (e.g. a content creation and upload application) may also run on the capturing device 110. In other embodiments, the blockchain image filtering applications, or modules thereof, may run on one or servers comprising the blockchain database.

Referring again to FIG. 1, the blockchain filtering application 130 of the computing system 120 may include a search criteria module 131, a filtering module 132, a locating module 133, and a purchasing module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the search criteria module 131 may include one or more components of hardware and/or software program code for receiving a search criteria from a user for searching through the corpus of digital images stored on the blockchain database 113. For instance, a user operating a computing device may search the blockchain database 113 for digital images uploaded to the blockchain database 113 by the plurality of capturing devices 110. Because the capturing devices 110 have uploaded the digital images with appended metadata, the user may search for specific images based on a plurality of factors. The user may create a search criteria searching for photographs based on a date, a capturing device identification information, an image identification, an image owner, a timestamp, a dynamic geolocation, a camera lens angle, a field of view direction, a beacon area, a geofence, a point of interest, a context surrounding the digital image, and a person of interest. For example, the user may only be interested in photographs taken between 6:00 PM and 6:30 PM, at the high school soccer field, facing the south goalie box. Various search criteria may be input by the user to intelligently search for digital images stored on the blockchain database 113.

Embodiments of the computing system 120 may include a filtering module 132. Embodiments of the filtering module 132 may include one or more components of hardware and/or software program code for filtering a corpus of digital images stored on the blockchain database 113, based on the plurality of factors that match the search criteria. For example, a corpus of digital images may be uploaded by the capturing device 110, or sent to the computing system 120 for uploading to the blockchain 113 by the computing system 120. The corpus of digital images may be populated to the blockchain 113 along with the appended metadata. Embodiments of the filtering module 132 may further characterize the digital images populated in the blockchain database 113 based on the appended metadata, for searching purposes. For instance, embodiments of the filtering module 132 may utilize the metadata relating to angle of lens and direction the camera is facing when taking the picture, along with an existing geofence surrounding an area to determine a beacon area within the geofenced area that the capturing device 110 captured in a particular image.

Figure 5:
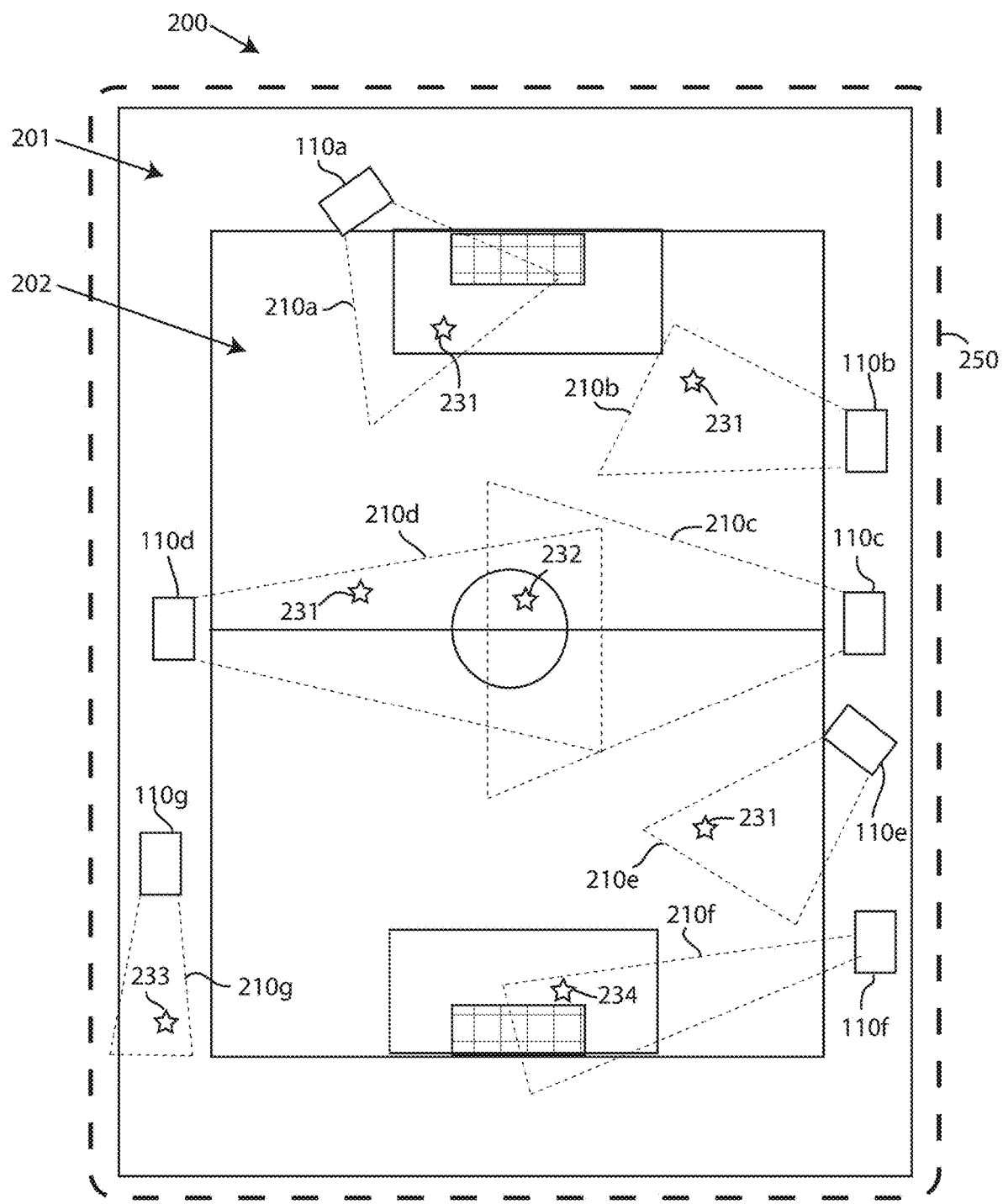
FIG. 5 depicts a geofenced area hosting an event with a plurality of capturing devices taking photographs within the geofenced area, in accordance with embodiments of the present invention.

FIG. 5 depicts a geofenced area hosting an event with a plurality of capturing devices 110 taking photographs within the geofenced area, in accordance with embodiments of the present invention. The geofenced area may be an area within the geofence 250. The geofenced area may include a passive section 201 and an active section 202. In the example shown in FIG. 5, the passive section 201 may be stands, bleachers, seats, etc. for spectators of an event unfolding on the active section 202. The active section 202 may be an area where activity is taking place that is desirable for taking photographs. In the example shown in FIG. 5, the active section 202 may be a soccer field or pitch. Other examples of an active section 202 may be a stage, a football field, a basketball court, a wrestling tournament floor, a gymnastics floor, a hockey ice, a lacrosse field, or any area where action is taking place that spectators may be photographing. Each capturing device 110a, 110b, 110c, 110d, 110e, 110f, 110g may have a field of view 210a, 210b, 210c, 210d, 210e, 210f, 210g when taking a photograph. The fields of view 210a, 210b, 210c, 210d, 210e, 210f, 210g may extend onto or cover a portion of the passive section 201 and/or active section 202. The fields of view 210a, 210b, 210c, 210d, 210e, 210f, 210g may also be at varying directions, angles, distances, etc.

Figure 6:
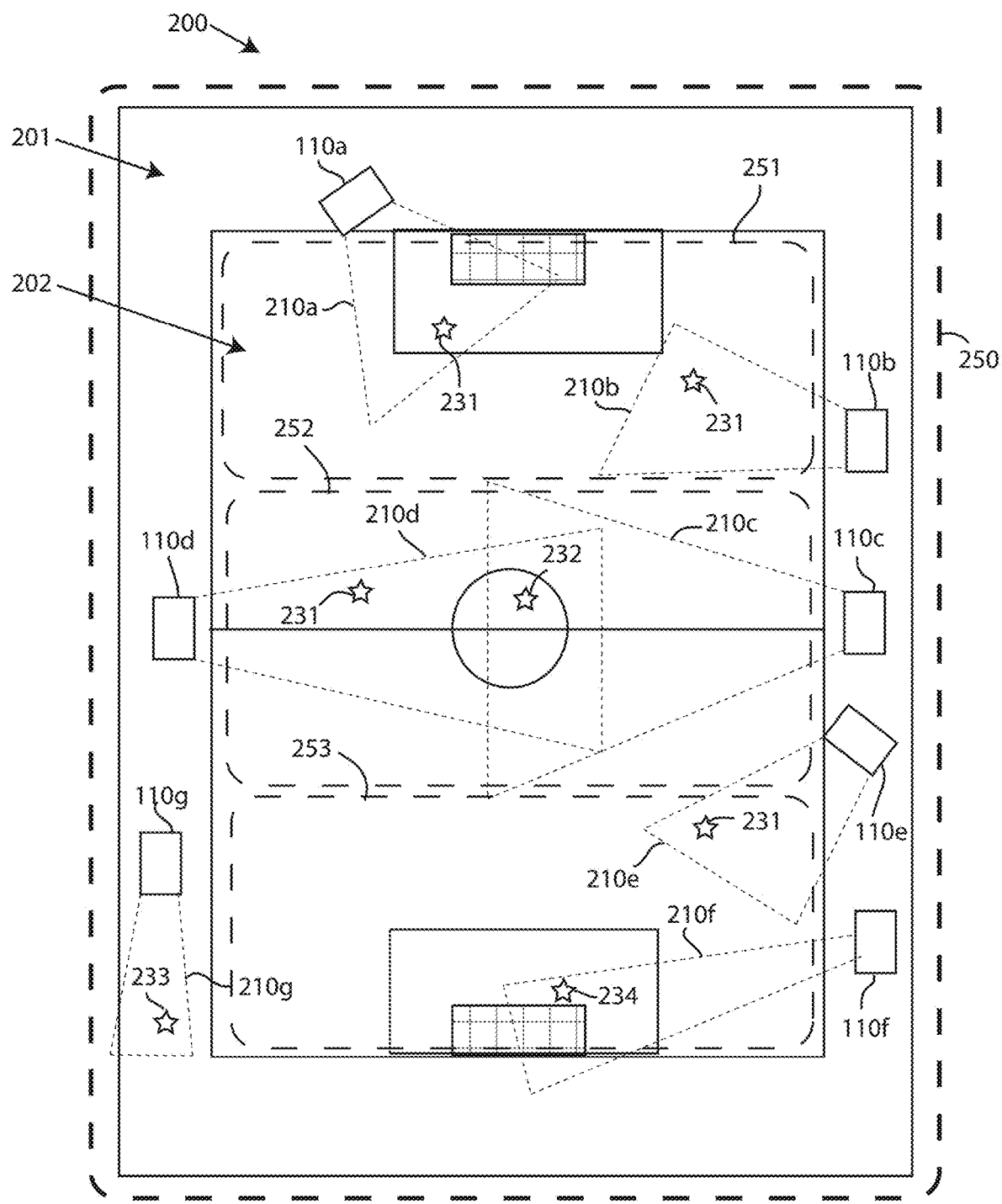
FIG. 6 depicts a geofenced area hosting an event with a plurality of capturing devices taking photographs within the geofenced area having defined beacon areas, in accordance with embodiments of the present invention.

FIG. 6 depicts a geofenced area hosting an event with a plurality of capturing devices 110 taking photographs within the geofenced area having defined beacon areas 251, 252, 253, in accordance with embodiments of the present invention. Embodiments of a beacon area may be a geofence surrounding physical area of the dynamic geolocation within the geofence 250 that defines a specific location of interest within the dynamic geolocation 250. The beacon areas may divide the geofenced area into a plurality of more specific geofenced areas that are relevant to the event. In the example shown in FIG. 6, the beacon area 251 may be a geofence surrounding a north goalie box of the active section 202 (i.e. soccer field), the beacon area 252 may be a geofence surrounding a midfield of the active section 202 (i.e. soccer field), and the third beacon area 253 may be a geofence surrounding a south goalie box of the active section 202 (i.e. soccer field). Embodiments of the beacon areas may be subdivisions of the larger geofence 250 surrounding an event or location hosting an event that people in the passive section 201 may want to photograph. The geofence 250 and the beacon areas 251, 252, 253 may be existing geofences set up by the event/venue or may be unique geofences set up by the event/venue for a limited time, for a specific event, etc.

Accordingly, embodiments of the filtering module 132 may expand a capability of a search function of digital images stored in the blockchain database 113 by allowing a user to search for images based on a plurality of factors, including a date, a capturing device identification information, an image identification, an image owner, a timestamp, a dynamic geolocation, a camera lens angle, a field of view direction, a beacon area, a geofence, a point of interest, a context surrounding the digital image, and a person of interest. For instance, the user may input "photos from xx/mm/yyyy between 6:00 PM and 6:45 PM at High School soccer field, showing photos of south goalie box." Embodiments of the filtering module 132 may filter the corpus of digital images based on a date, a time, a geolocation, and a beacon area of the geolocation. Thus, a parent of a child playing goalie in the soccer game on a particular date, time, and location may be able to quickly locate photographs of the parent's child captured by capturing devices 110 within the geofence 250, such as capturing device 110f, that had a field of view, such as field of view 210f, encompassing the south goalie box of the playing field.

In response to receiving the user search criteria, the filtering module 132 may filter the corpus of digital images based on a plurality of factors contained in the search criteria (e.g. date, time, beacon area, direction that the camera is facing, etc.). FIG. 7 depicts a data table of a populated blockchain database 113, wherein the digital images are classified based on factors, in accordance with embodiments of the present invention. As shown in FIG. 7, the digital images associated with the capturing devices 110a-f are archived and searchable by factor. Although FIG. 7 depicts seven total digital images and seven total capturing devices, the filtering module 132 may filter through a significant number of images, wherein multiple images are associated with a same capturing device 110. FIG. 8 depicts a data table that has been further filtered based on a user search criteria, in accordance with embodiments of the present invention. In response to receiving a user search criteria containing, "photos from xx/mm/yyyy between 6:45 PM and 7:30 PM at High School soccer field, showing photos of south goalie box," the filtering module 132 may manipulate the data table to exclude digital images that do not match the user search criteria, as shown in FIG. 8. The ability to search by these factors, including beacon areas, expands a search capability to narrow down not only specific events but specific locations within the event. For example, the parent may be searching for the south goalie box because the parent's child may be the goalie covering the net at the south end of the field, or the parent' child may be an attacker taking shots at the south goal. The increased search capability as function of the filtering by the filtering module 132 may reduce a search time to locate a photograph that a user cares about the most.

In another example, FIG. 9A depicts another a data table that has been further filtered based on a user search criteria, in accordance with embodiments of the present invention. In response to receiving a user search criteria containing, "photos from xx/mm/yyyy between 7:15 PM and 7:30 PM at High School soccer field, showing photos of midfield," the filtering module 132 may manipulate the data table to exclude digital images that do not match the user search criteria, as shown in FIG. 9A. However, the user also wants photographs of the front of the child in the marching band playing at midfield. FIG. 9B depicts a second data table that has been further filtered from the first data table, based on updated user search criteria, in accordance with embodiments of the present invention. The user updates the search to "photos from xx/mm/yyyy between 7:15 PM and 7:30 PM at High School soccer field, showing photos of midfield from the E." The filtering module 132 may manipulate the data table to exclude digital images that do not match the user search criteria, as shown in FIG. 9B. The ability to search by these factors, including beacon areas, camera direction, time, location, etc. expands a search capability to narrow down not only specific events but specific locations within the event from specific angles and directions.

Referring back to FIG. 1, embodiments of the filtering module 132 may tag a context to the corpus of digital images stored on the blockchain database 113 using a machine learning visual recognition engine. As a result, a user search criteria that includes only a context (e.g. # marchingband) and not a specific recitation of factors (e.g. "show pictures of midfield at halftime of the soccer game), results in digital images not containing the context being excluded from the corpus of digital images as a part of the filtering. In some embodiments, the tagging may be performed prior to the final filtering as a pre-filtering tool or step to reduce a number of digital images to be finally filtered after the context is considered, decreasing a time between receiving the search criteria and the locating of the one or more specific digital photographs. Moreover, embodiments of the filtering module 132 may a facial recognition technique using a facial recognition software on the corpus of digital images stored on the blockchain database 113. The filtering module 132 may perform the facial recognition after the images are uploaded into the blockchain database 113, or may perform the facial recognition in response to receiving the search criteria including a person of interest. The facial recognition filter may exclude digital images not containing the person of interest from the corpus of digital images as part of the filtering. In some embodiments, the facial recognition may be performed prior to the filtering as a pre-filtering tool or step to reduce a number of digital images to be filtered, decreasing a time between receiving the search criteria and the locating of the one or more specific digital photographs.

As an example of the facial recognition filter or pre-filter, reference is made again to FIGS. 5-6. Persons of interest 231, 232, 232, 233, 234 may be people that a user is searching for using the digital image filtering system 100. Embodiments of the filtering module 132 may utilize facial recognition software to determine whether a person of interest 231, 232, 233, 234 is encompassed in the field of views of the capturing devices. For example, the filtering module 132 may determine that person of interest 231, whom may be a player on one of the soccer teams, is captured in the digital images associated with capturing device 110a, 110b, 110d, and 110e, at various times, various angles and directions, various beacons, etc. The filtering module 132 may determine that the digital images from capturing device 110c and 110g do not encompass person of interest 231. Likewise, person of interest 232 may be a musician in a marching band, playing in the band at midfield during halftime. Capturing devices 110c and 110d both have taken photographs that encompass person of interest 232, at a similar time, and same beacon area of midfield. Thus, the filtering module 132 may not exclude the digital images from the capturing device 110c and 110d; however, further specific filtering may be performed to narrow down which photograph has a better angle, at the time the picture was taken.

Referring back to FIG. 1. embodiments of the computing system 120 may include a locating module 133. Embodiments of the locating module 133 may include one or more components of hardware and/or software program for locating one or more specific digital photographs that match the search criteria among the corpus of digital images stored on the blockchain database, as a function of the filtering. For instance, the locating module 133 may isolate one or more images from the filtered images in the blockchain database 113 for presenting the one or more specific digital photographs to the user for selection and purchase of the one or more specific digital photographs.

Embodiments of the computing system 120 may include a purchasing module 134. Embodiments of the purchasing module 134 may include one or more components of hardware and/or software program for processing a purchase order for the one or more specific digital photographs selected for purchase by the user. For example, the purchasing module 134 may facilitate a secure payment for the digital image, such that the true owner of the digital image receives electronic payment. The purchase module 134 may make the purchased digital image available for download, and may automatically send a usage license agreement for the purchased digital photograph.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the digital image blockchain filtering system 100 improves image/content database technology by expanding a searching functionality and capability through use of a filter tool. The content database searching ability is improved because a user can search for various dynamic factors that are based on a set of rules for location (e.g. geolocations rules and beacon area geofencing rules), persons of interest (e.g. facial recognition pre-filter), quality of images (e.g. cellphone v. SLR images), lens angles and direction of camera, etc.

Furthermore, the digital image blockchain filtering system 100 improves a speed in which a user can search and locate a desired image of various qualities, angles, locations, points in time, etc. Without applying the filter tool to the blockchain database of images and combining the devices into a single stream of content creation from multiple devices for uploading to the blockchain, the user would have to know what time the event took place, whether a photographer attended the event, what specific point in time was the person of interest encompassed in a photograph, whether, etc. Even with that knowledge, the user would not be able to search and locate the most desirable image(s) from a particular area on the field, for example. Embodiments of the digital image blockchain filtering system 100 provides a technical solution to the above-drawbacks by connecting content creation devices, the blockchain, and a filter tool that improves database indexing, searching, and content management. The technical solution(s) described herein is necessarily rooted in computer technology in order to overcome a problem specifically arising in the realm of content database management, searching, manipulation, filtering, based on a plurality of dynamic factors that can be searchable by the user.

Figure 10:
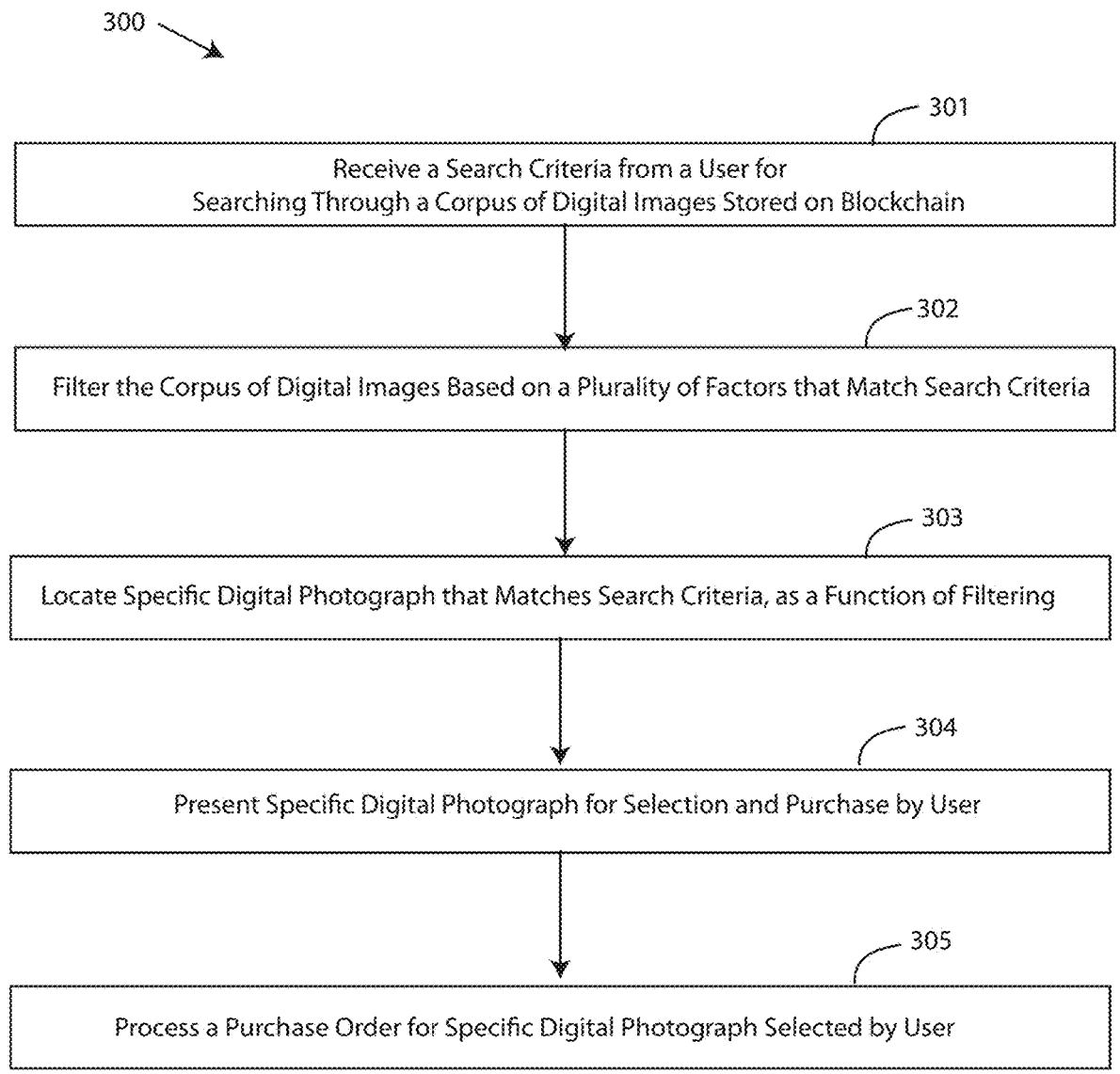
FIG. 10 depicts a flow chart of a method for filtering digital images stored on a blockchain database to locate one or more specific digital images from a corpus of digital images from an event, in accordance with embodiments of the present invention.

Referring now to FIG. 10, which depicts a flow chart of a method 300 for filtering digital images stored on a blockchain database to locate one or more specific digital images from a corpus of digital images from an event, in accordance with embodiments of the present invention. One embodiment of a method 300 or algorithm that may be implemented for filtering digital images stored on a blockchain database to locate one or more specific digital images from a corpus of digital images from an event with the digital image blockchain filtering system 100 described in FIGS. 1-9B using one or more computer systems as defined generically in FIG. 11 below, and more specifically by the specific embodiments of FIG. 1.

Embodiments of the method 300 for filtering digital images stored on a blockchain database to locate one or more specific digital images from a corpus of digital images from an event, in accordance with embodiments of the present invention, may begin at step 301 wherein a search criteria is received from a user for searching through a corpus of digital images stored on a blockchain database. Step 302 filters the corpus of digital images based on a plurality of factors that match the search criteria. Step 303 locates a specific digital photograph that matches the search criteria. Step 304 presents the specific digital photograph for selection and purchase by the user. Step 305 processes a purchase order for specific digital photograph selected by the user.

Figure 11:
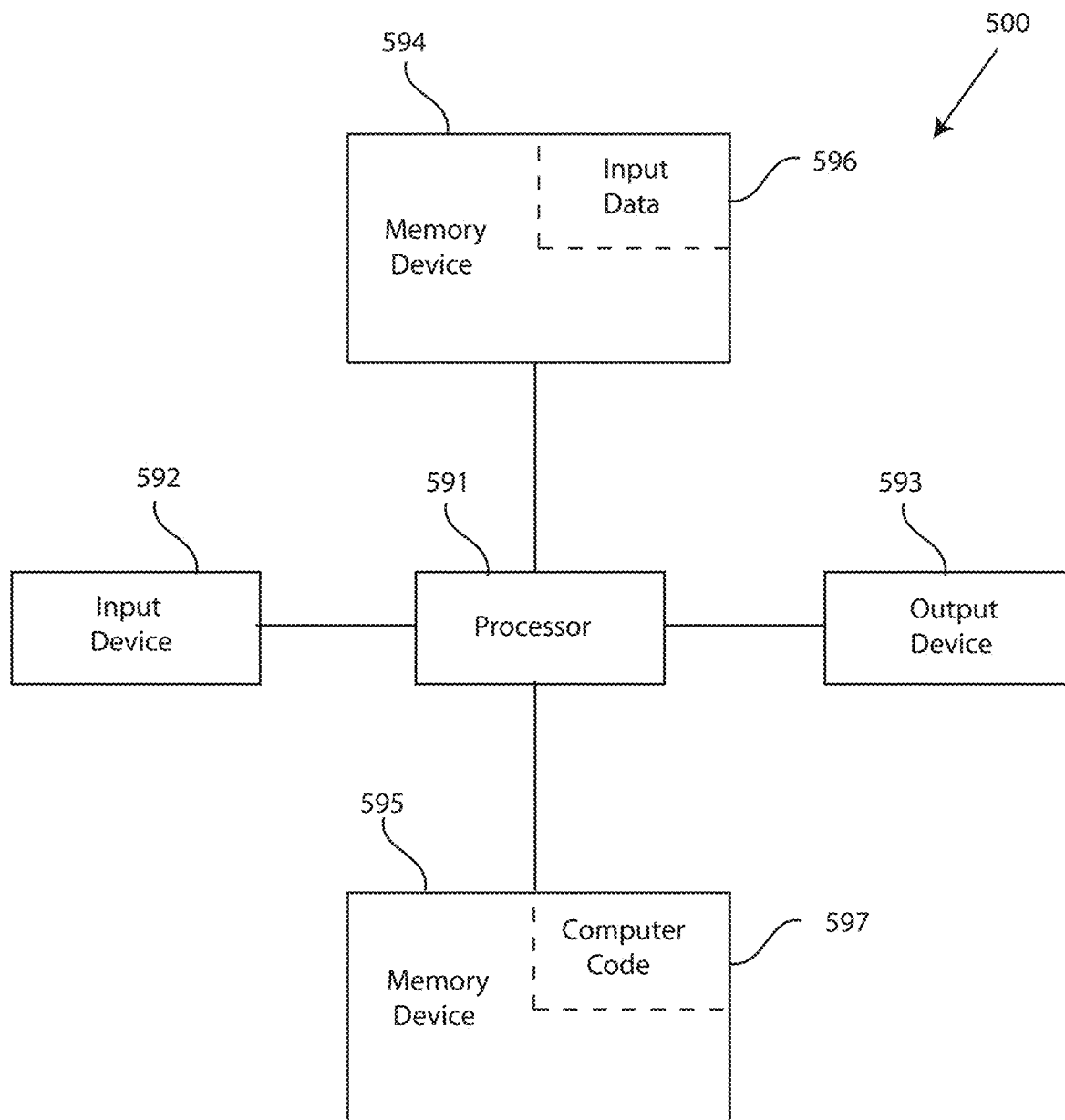
FIG. 11 depicts a block diagram of a computer system for the digital image blockchain filter system 100 of FIGS. 1-9B, capable of implementing methods method for filtering digital images stored on a blockchain database to locate one or more specific digital images from a corpus of digital images from an event of FIG. 10, in accordance with embodiments of the present invention.

FIG. 11 depicts a block diagram of a computer system for the digital image blockchain filter system 100 of FIGS. 1-9B, capable of implementing methods method for filtering digital images stored on a blockchain database to locate one or more specific digital images from a corpus of digital images from an event of FIG. 10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for filtering digital images stored on a blockchain database to locate one or more specific digital images from a corpus of digital images from an event in the manner prescribed by the embodiments of FIG. 10 using the digital image blockchain filter system 100 of FIGS. 1-9B, wherein the instructions of the computer code 597 may be executed by processor 591 via memory device 595. The computer code 597 may include software or program instructions that may implement one or more algorithms for implementing the method for filtering digital images stored on a blockchain database to locate one or more specific digital images from a corpus of digital images from an event, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to blockchain filtering systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor (s) 591, wherein the processor(s) carry out instructions contained in the computer code 597 causing the computer system to filter digital images stored on a blockchain database to locate one or more specific digital images from a corpus of digital images from an event. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for filtering digital images stored on a blockchain database to locate one or more specific digital images from a corpus of digital images from an event. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for filtering digital images stored on a blockchain database to locate one or more specific digital images from a corpus of digital images from an event.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
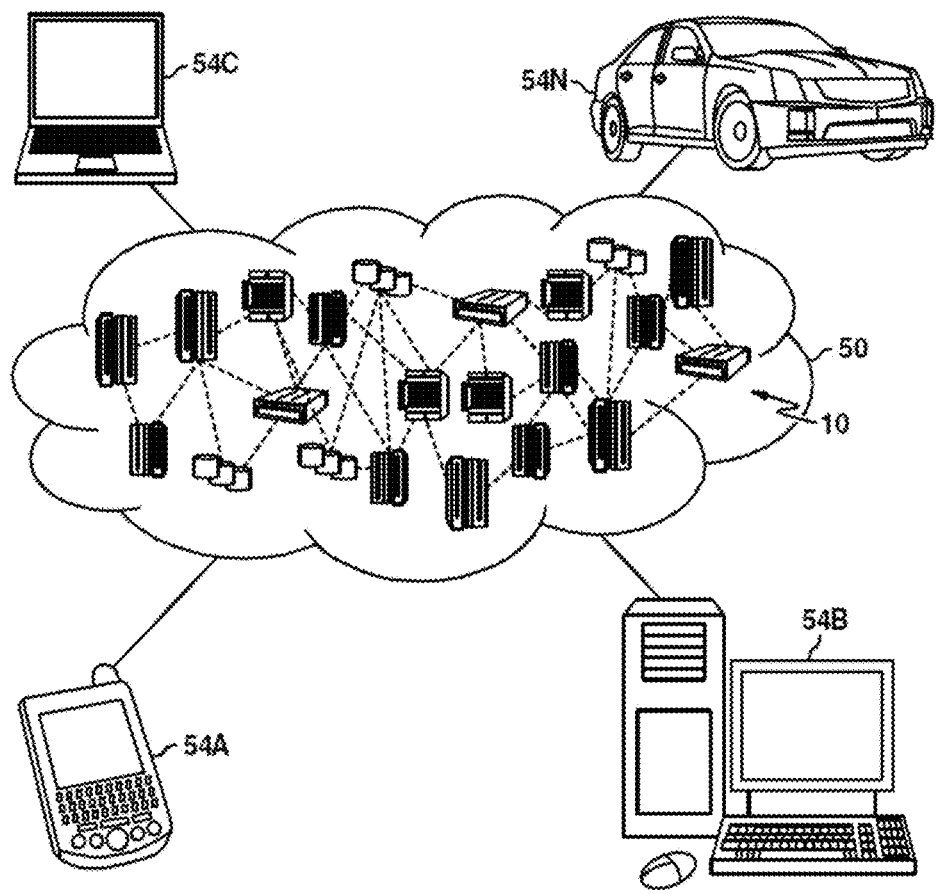
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
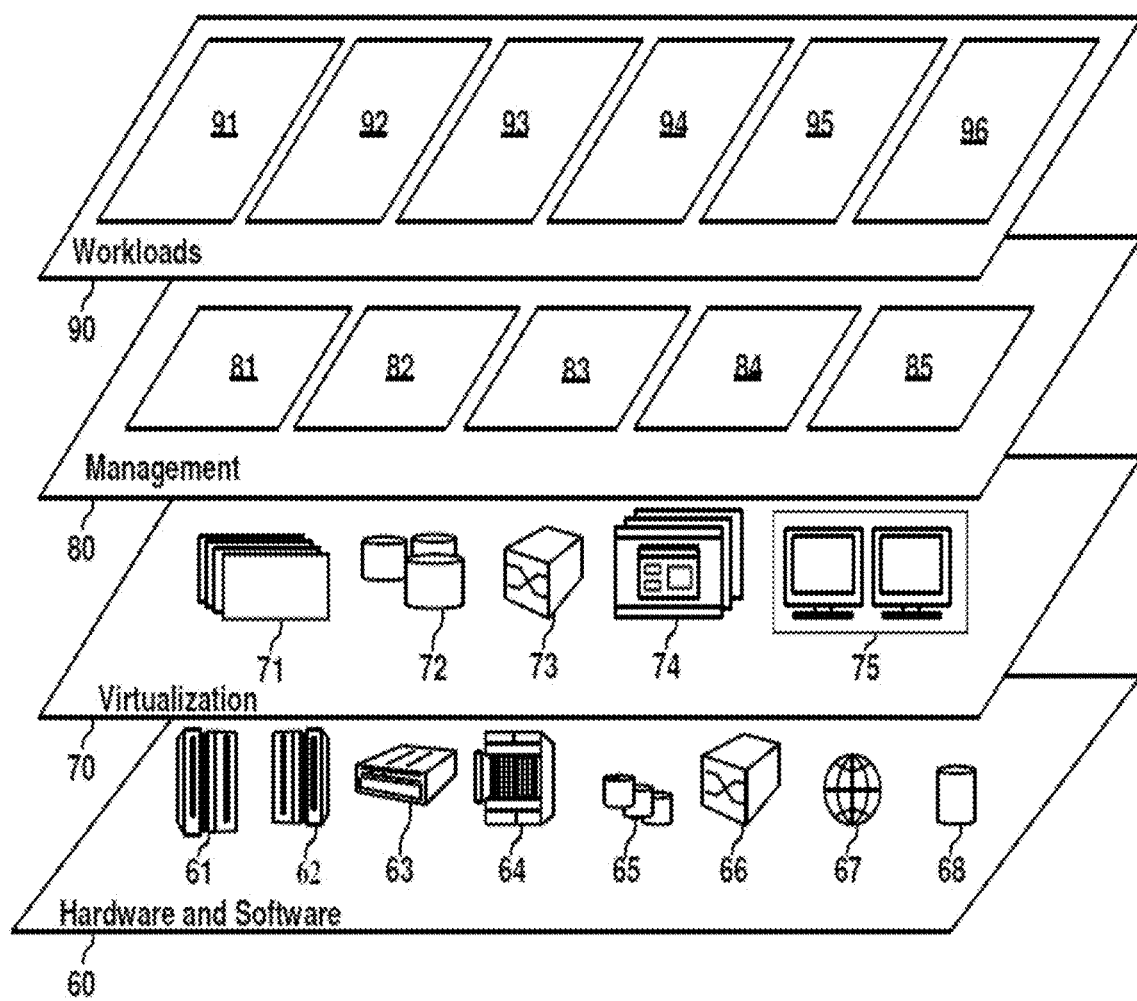
FIG. 13 depicts abstraction model layers, in accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and blockchain image filtering 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for filtering digital images stored on a blockchain database to locate one or more specific digital images from a corpus of digital images from an event that includes a plurality of defined beacon areas within a geofence surrounding the event, the method comprising:

receiving, by a processor of a computing system, a search criteria from a user for searching through the corpus of digital images stored on the blockchain database, wherein digital data associated with each digital image is uploaded to the blockchain database by a digital data capturing device after the digital data capturing device appends metadata to the digital data at a time of creation of the digital data that defines a plurality of factors associated with the digital image;

performing, by the processor, a facial recognition technique using a facial recognition software on the corpus of digital images stored on the blockchain database, in response to receiving the search criteria including a person of interest, wherein digital images not containing the person of interest are excluded from the corpus of digital images prior to filtering to reduce a number of digital images to be filtered, decreasing a time between receiving the search criteria and locating of the one or more specific digital photographs;

filtering, by the processor, the corpus of digital images stored on the blockchain database based on the plurality of factors that match the search criteria, wherein at least one factor includes a beacon area of the plurality of defined beacon areas, the defined beacon areas being subdivisions of the geofence that are relevant to the event, and comprise a passive section and an active section of a geofenced area of the event;

locating, by the processor, the one or more specific digital images that match the search criteria among the corpus of digital images stored on the blockchain database, as a function of the filtering;

presenting, by the processor, the one or more specific digital images to the user for selection and purchase of the one or more specific digital images; and processing, by the processor, a purchase order for the one or more specific digital images selected for purchase by the user.

2. The method of claim 1, wherein the plurality of factors includes a date, a capturing device identification information, an image identification, an image owner, a timestamp, a dynamic geolocation, a camera lens angle, a field of view direction, a point of interest, a context surrounding the digital image, and a person of interest.

3. The method of claim 2, wherein the dynamic geolocation is a location of an event that is being photographed by at least one photographer.

4. The method of claim 1, further comprising:

tagging, by the processor, a context to the corpus of digital images stored on the blockchain database using a machine learning visual recognition engine, wherein the search criteria that includes only the context results in digital images not containing the context being excluded from the corpus of digital images prior to the filtering to reduce a number of digital images to be filtered, decreasing a time between receiving the search criteria and the locating of the one or more specific digital photographs.

5. The method of claim 1, wherein the digital data capturing device is a device that has a network interface controller for uploading the digital data and metadata to the blockchain database, and is selected from the group consisting of: a digital camera, a smartphone, a smartwatch, a tablet computer, smart glasses, a fixed camera, a recorder, and a video camera.

6. A computing system, comprising:

a processor;

a memory device coupled to the processor; and a computer readable storage device coupled to the processor, wherein the storage device contains program code executable by the processor via the memory device to implement a method for filtering digital images stored on a blockchain database to locate one or more specific digital images from a corpus of digital images from an event that includes a plurality of defined beacon areas within a geofence surrounding the event, the method comprising:

receiving, by a processor of a computing system, a search criteria from a user for searching through the corpus of digital images stored on the blockchain database, wherein digital data associated with each digital image is uploaded to the blockchain database by a digital data capturing device after the digital data capturing device appends metadata to the digital data at a time of creation of the digital data that defines a plurality of factors associated with the digital image;

performing, by the processor, a facial recognition technique using a facial recognition software on the corpus of digital images stored on the blockchain database, in response to receiving the search criteria including a person of interest, wherein digital images not containing the person of interest are excluded from the corpus of digital images prior to filtering to reduce a number of digital images to be filtered, decreasing a time between receiving the search criteria and locating of the one or more specific digital photographs;

filtering, by the processor, the corpus of digital images stored on the blockchain database based on the plurality of factors that match the search criteria, wherein at least one factor includes a beacon area of the plurality of defined beacon areas, the defined beacon areas being subdivisions of the geofence that are relevant to the event, and comprise a passive section and an active section of a geofenced area of the event;

locating, by the processor, the one or more specific digital images that match the search criteria among the corpus of digital images stored on the blockchain database, as a function of the filtering;

presenting, by the processor, the one or more specific digital images to the user for selection and purchase of the one or more specific digital images; and processing, by the processor, a purchase order for the one or more specific digital images selected for purchase by the user.

7. The computer system of claim 6, wherein the plurality of factors includes a date, a capturing device identification information, an image identification, an image owner, a timestamp, a dynamic geolocation, a camera lens angle, a field of view direction, a point of interest, a context surrounding the digital image, and a person of interest.

8. The computer system of claim 7, wherein the dynamic geolocation is a location of an event that is being photographed by at least one photographer.

9. The computer system of claim 6, further comprising:
tagging, by the processor, a context to the corpus of digital images stored on the blockchain database using a machine learning visual recognition engine, wherein the search criteria that includes only the context results in digital images not containing the context being excluded from the corpus of digital images prior to the filtering to reduce a number of digital images to be filtered, decreasing a time between receiving the search criteria and the locating of the one or more specific digital photographs.

10. The computer system of claim 6, wherein the digital data capturing device is a device that has a network interface controller for uploading the digital data and metadata to the blockchain database, and is selected from the group consisting of: a digital camera, a smartphone, a smartwatch, a tablet computer, smart glasses, a fixed camera, a recorder, and a video camera.

11. A computer program product, comprising a computer readable hardware storage device storing a computer readable program code, the computer readable program code comprising an algorithm that when executed by a computer processor of a computing system implements a method for filtering digital images stored on a blockchain database to locate one or more specific digital images from a corpus of digital images from an event that includes a plurality of defined beacon areas within a geofence surrounding the event, the method comprising:

receiving, by a processor of a computing system, a search criteria from a user for searching through the corpus of digital images stored on the blockchain database, wherein digital data associated with each digital image is uploaded to the blockchain database by a digital data capturing device after the digital data capturing device appends metadata to the digital data at a time of creation of the digital data that defines a plurality of factors associated with the digital image;

performing, by the processor, a facial recognition technique using a facial recognition software on the corpus of digital images stored on the blockchain database, in response to receiving the search criteria including a person of interest, wherein digital images not containing the person of interest are excluded from the corpus of digital images prior to filtering to reduce a number of digital images to be filtered, decreasing a time between receiving the search criteria and locating of the one or more specific digital photographs;

filtering, by the processor, the corpus of digital images stored on the blockchain database based on the plurality of factors that match the search criteria, wherein at least one factor includes a beacon area of the plurality of defined beacon areas, the defined beacon areas being subdivisions of the geofence that are relevant to the event, and comprise a passive section and an active section of a geofenced area of the event;

locating, by the processor, the one or more specific digital images that match the search criteria among the corpus of digital images stored on the blockchain database, as a function of the filtering;

presenting, by the processor, the one or more specific digital images to the user for selection and purchase of the one or more specific digital images; and processing, by the processor, a purchase order for the one or more specific digital images selected for purchase by the user.

12. The computer program product of claim 11, wherein the plurality of factors includes a date, a capturing device identification information, an image identification, an image owner, a timestamp, a dynamic geolocation, a camera lens angle, a field of view direction, a point of interest, a context surrounding the digital image, and a person of interest.

13. The computer program product of claim 11, further comprising:
tagging, by the processor, a context to the corpus of digital images stored on the blockchain database using a machine learning visual recognition engine, wherein the search criteria that includes only the context results in digital images not containing the context being excluded from the corpus of digital images prior to the filtering to reduce a number of digital images to be filtered, decreasing a time between receiving the search criteria and the locating of the one or more specific digital photographs.

14. The computer program product of claim 11, wherein the digital data capturing device is a device that has a network interface controller for uploading the digital data and metadata to the blockchain database, and is selected from the group consisting of: a digital camera, a smartphone, a smartwatch, a tablet computer, smart glasses, a fixed camera, a recorder, and a video camera.

* * * * *